US010857681B2

(12) United States Patent
Liu et al.

(10) Patent No.: US 10,857,681 B2
(45) Date of Patent: Dec. 8, 2020

(54) FINGER OF ROBOTIC HAND AND ROBOT HAVING THE SAME

(71) Applicant: UBTECH Robotics Corp, Shenzhen (CN)

(72) Inventors: Sicong Liu, Shenzhen (CN); Youjun Xiong, Shenzhen (CN); Hongyu Ding, Shenzhen (CN); Qidong Xu, Shenzhen (CN); Jianxin Pang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 44 days.

(21) Appl. No.: 16/370,889

(22) Filed: Mar. 30, 2019

(65) Prior Publication Data

US 2020/0206949 A1    Jul. 2, 2020

(30) Foreign Application Priority Data

Dec. 29, 2018 (CN) .......................... 2018 1 1640948

(51) Int. Cl.
*B25J 15/08* (2006.01)
*F16C 1/12* (2006.01)
*F16H 25/20* (2006.01)
*B25J 15/00* (2006.01)
*F16C 1/16* (2006.01)

(52) U.S. Cl.
CPC .......... *B25J 15/0009* (2013.01); *B25J 15/08* (2013.01); *F16C 1/16* (2013.01); *F16H 25/20* (2013.01)

(58) Field of Classification Search
CPC ........ B25J 9/104; B25J 15/0009; B25J 15/08; F16C 1/16; F16H 25/20
See application file for complete search history.

(56) References Cited

U.S. PATENT DOCUMENTS

| 5,447,403 | A  | * | 9/1995  | Engler, Jr. ........... | B25J 15/0009 294/111 |
| 6,896,704 | B1 | * | 5/2005  | Higuchi .................... | A61F 2/68 623/64 |
| 8,342,586 | B2 | * | 1/2013  | Sim ........................... | B25J 5/00 294/106 |
| 8,419,096 | B2 | * | 4/2013  | Kim ..................... | B25J 15/0009 294/111 |
| 8,915,528 | B2 | * | 12/2014 | Haslinger ............... | A61F 2/586 294/106 |
| 8,936,289 | B1 | * | 1/2015  | Kozlowski ............... | B25J 15/08 294/106 |
| 8,936,290 | B1 | * | 1/2015  | Salisbury ............... | B25J 19/065 294/111 |
| 9,669,551 | B1 | * | 6/2017  | Salisbury ............. | B25J 15/0475 |
| 10,682,756 | B1 | * | 6/2020  | Liu ......................... | F16H 25/20 |
| 10,786,909 | B2 | * | 9/2020  | Yamanaka ............... | B25J 17/00 |

(Continued)

*Primary Examiner* — Adam D Rogers (57) ABSTRACT

A finger of a robotic hand includes a palm portion, a fixed phalanx fixed to the palm portion, a first movable phalanx rotatably connected to the fixed phalanx, a second movable phalanx rotatably connected to the first movable phalanx, a first pulling member to pull the first movable phalanx so as to rotate the first movable phalanx with respect to the fixed phalanx, a second pulling member to pull the second movable phalanx so as to rotate the second movable phalanx with respect to the first movable phalanx, and an actuator to pull the first pulling member.

15 Claims, 6 Drawing Sheets

(56) References Cited

U.S. PATENT DOCUMENTS

2009/0025502 A1\* 1/2009 Nakamoto ........... B25J 15/0009
74/490.01
2020/0206955 A1\* 7/2020 Liu ......................... B25J 9/102
2020/0230810 A1\* 7/2020 Ragusila ................. B25J 9/104

\* cited by examiner

FINGER OF ROBOTIC HAND AND ROBOT HAVING THE SAME

CROSS REFERENCE TO RELATED APPLICATIONS

This application claims priority to Chinese Patent Application No. 201811640948.8, filed Dec. 29, 2018, which is hereby incorporated by reference herein as if set forth in its entirety.

BACKGROUND

1. Technical Field

The present disclosure generally relates to robots, and particularly to a finger of a robotic hand and a robot including the finger.

2. Description of Related Art

Manipulable hand-like apparatuses are utilized in several industries. One such apparatus is a multi-fingered robotic hand of a humanoid robot. The multi-fingered robotic hand includes a plurality of fingers capable of performing certain grasping operations. A finer of the robotic hand includes two or more phalanxes. In some conventional robotic hands, each phalanx is driven by an actuator and one robotic hand then needs ten or more actuators. One problem with such configuration is that the robotic hands are bulky due to the actuators.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Referring to FIGS. 1-6, in one embodiment, a finger of a robotic hand includes a palm portion 10, a fixed phalanx 20 fixed to the palm portion 10, a first movable phalanx 30 rotatably connected to the fixed phalanx 20, a second movable phalanx 40 rotatably connected to the first movable phalanx 30, a first pulling member 50 to pull the first movable phalanx 30 so as to rotate the first movable phalanx 30 with respect to the fixed phalanx 20, a second pulling member 60 to pull the second movable phalanx 40 so as to rotate the second movable phalanx 40 with respect to the first movable phalanx 30, and an actuator 70 to pull the first pulling member 50. In the embodiment, the first pulling member 50 and the second pulling member 60 are flexible.

With such configuration, the first movable phalanx 30 and the second movable phalanx 40 are driven to rotate by using one actuator 70, which facilitates the compactness and reduction of weight and cost of the robotic hand.

In the embodiment, the first pulling member 50 and the second pulling member 60 are of strip or belt shape and made of flexible material so as to be connected to the first movable phalanx 30 and the second movable phalanx 40. For example, they can be steel wires, Dyneema® cable, steel belt and the like.

In the embodiment, rotation of the first movable phalanx 30 causes the second pulling member 60 to pull the second movable phalanx 40 to rotate synchronously, which will be described in detail later.

The fixed phalanx 20 includes two housings 21 that are connected to each other. The first movable phalanx 30 includes two housings 31 that are connected to each other. The second movable phalanx 40 includes two housings 41 and a cover 42 that are connected to one another. The fixed phalanx 20 and the first movable phalanx 30 each define a through hole to allow the first pulling member to pass therethrough, such that the first pulling member 50 can pass through the fixed phalanx 20 and extend into the first movable phalanx 30. Similarly, the second movable phalanx 40 defines a through hole to allow the second pulling member 60 to pass therethrough, such that the second pulling member 60 can extend from inside the first movable phalanx 30 into the second movable phalanx 40.

In one embodiment, the fixed phalanx 20 includes a first shaft 22. The first movable phalanx 30 includes a first shaft receiver 32 that defines a first receiving hole 321 to rotatably receive the first shaft 22 therein. In one embodiment, the first shaft receiver protrudes from an inner surface 301 of the first movable phalanx 30. One end of the first pulling member 50 is fixed to the first shaft receiver 32. When the actuator 70 pulls the first pulling member 50, the first pulling member 50 then pulls the first shaft receiver 32 and drives the first movable phalanx 30 to rotate about the first shaft 22.

In one embodiment, the first movable phalanx 30 a second shaft 33. The second movable phalanx 40 includes a second shaft receiver 43 that defines a second receiving hole 431 to rotatably receive the second shaft 33 therein. The second pulling member 60 has two opposite ends respectively fixed to the first shaft 22 and the second shaft receiver 43. An imaginary plane determined by rotation axes of the first shaft 22 and the second shaft 33 intersects the second pulling member 60 in a position between the first shaft 22 and the second shaft 33. With such configuration, when the first movable phalanx 30 rotates about the first shaft 22, the second pulling member 60 will pull the second movable phalanx 40 to rotate the second movable phalanx 40 about the second shaft 43.

In one embodiment, the finger further includes a cap 23 fixed to the first shaft 22. One of the two ends of the second pulling member 60 is fixed to the first shaft 22 via the cap 23. The cap 23 is stationary relative to the fixed phalanx 20 during rotation of the first movable phalanx 30 and the second movable phalanx 40. In one embodiment, the cap 23 and the first shaft 22 are connected to each other through profile shaft connection that is a connection technique that uses a shaft and a shaft hole both having non-circular cross section. The cap 23 defines a connecting hole 231 through which the second pulling member 60 passes and is fixed to the cap 23.

In one embodiment, the diameter of the first shaft receiver 32 has a predetermined proportional relationship with the diameter of the second shaft receiver 43. For example, when the diameter of the first shaft receiver 32 is equal to the diameter of the second shaft receiver 43, the first movable phalanx 30 and the second movable phalanx 40 have the same angular velocity during rotation. A ratio of the angular velocity of the first movable phalanx 30 to the angular velocity of the second movable phalanx 40 can be adjusted by changing the ratio of the diameter of the first shaft receiver 32 to the second shaft receiver 43.

Figure 1:
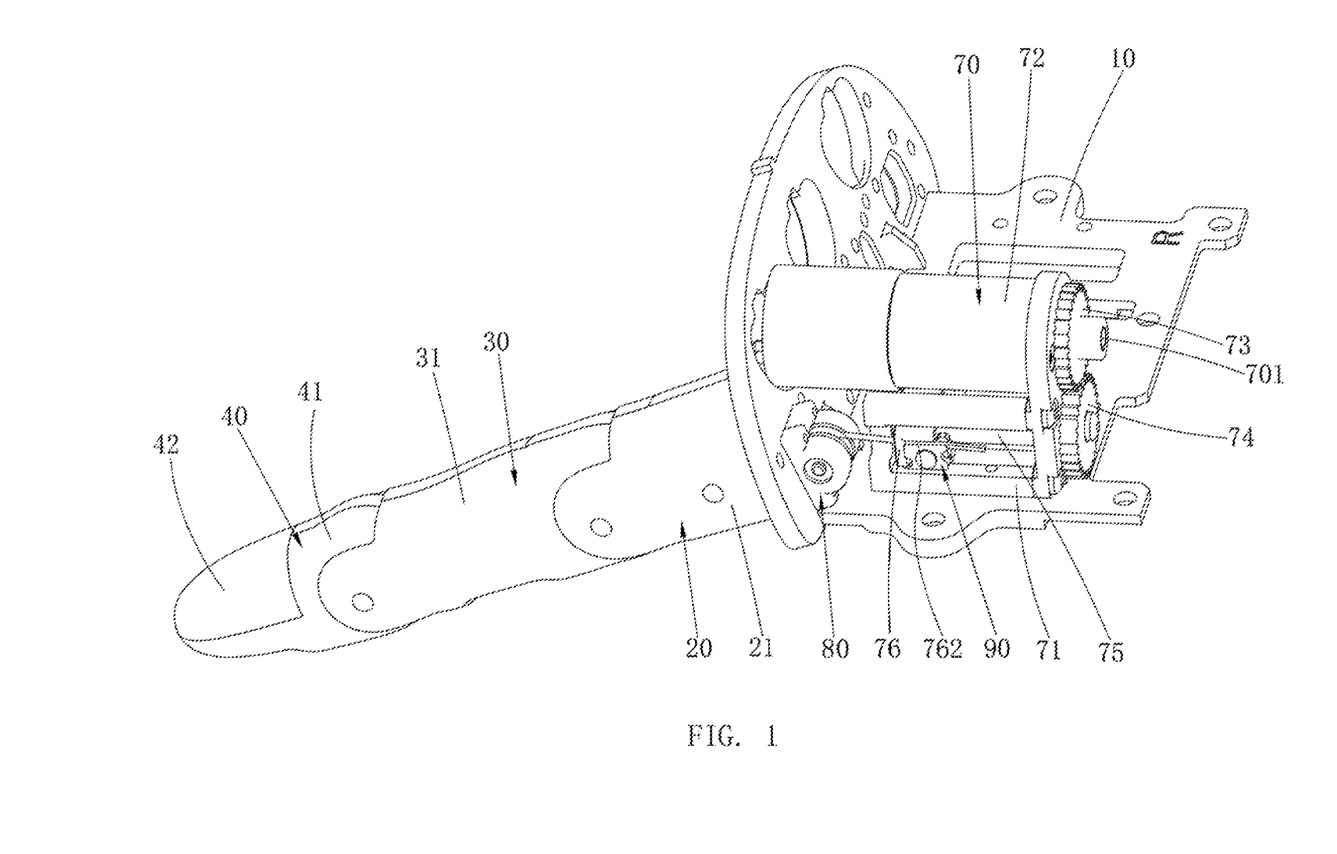
FIG. 1 is a schematic isometric view of a finger of a robotic hand in an extended state according to an embodiment.
Figure 2:
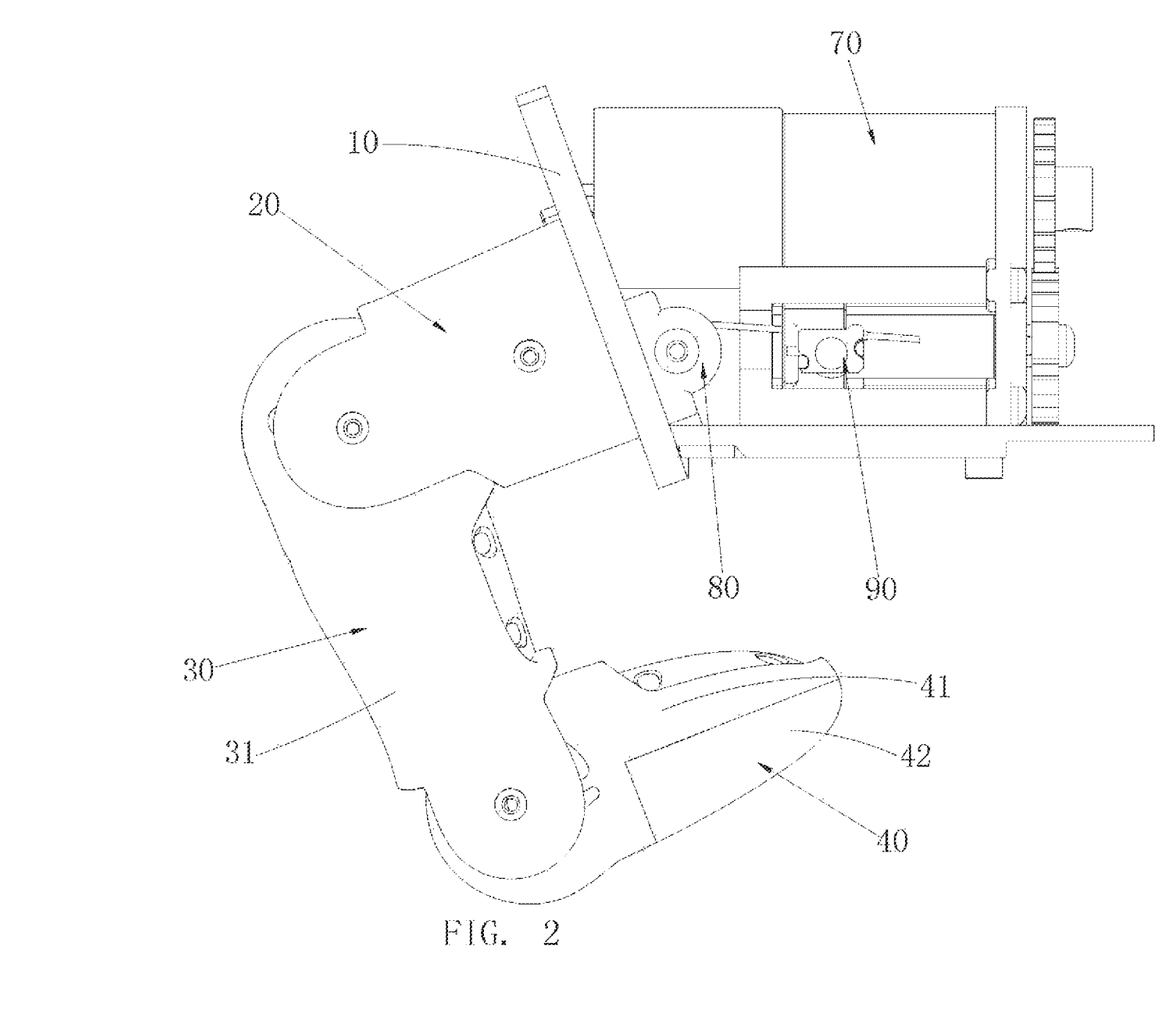
FIG. 2 is a schematic isometric view of the finger of FIG. 1 in a flexed state.
Figure 3:
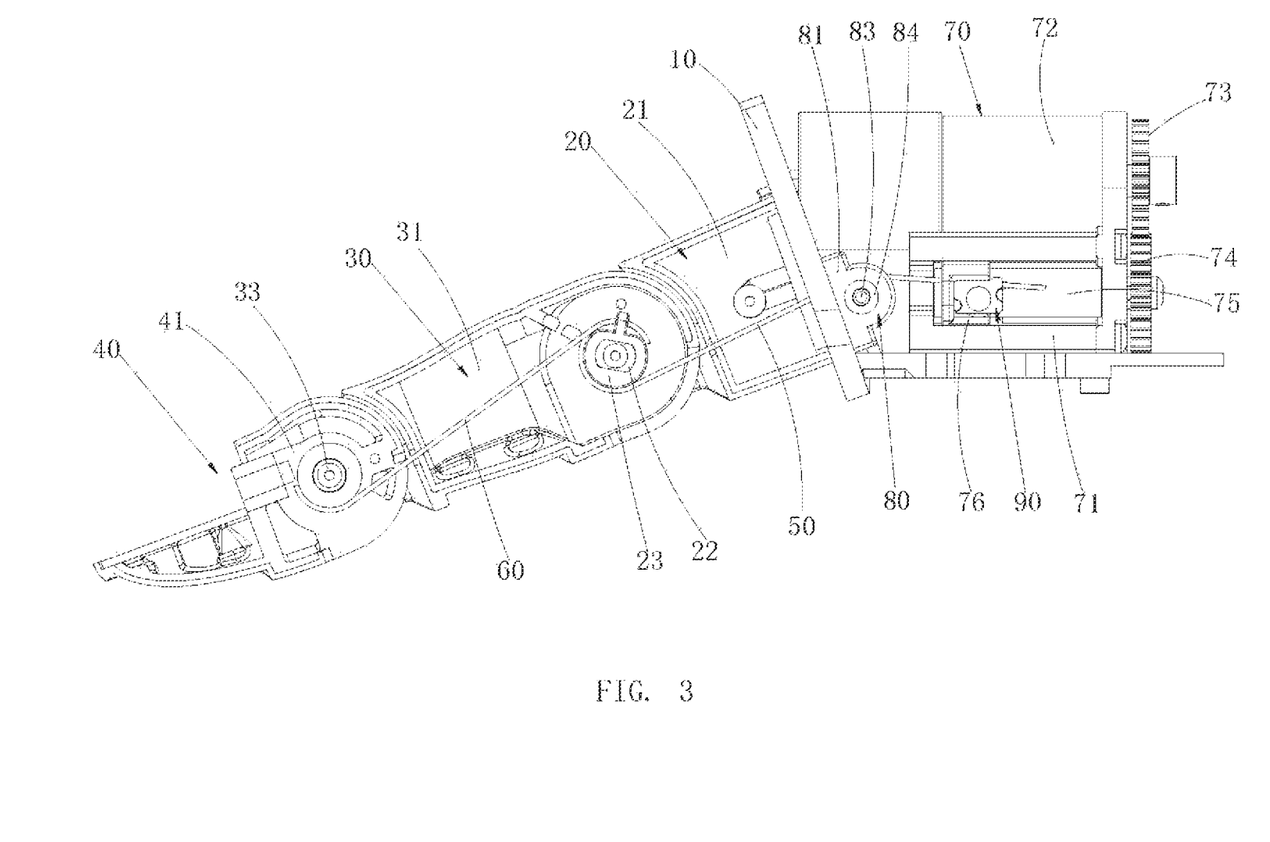
FIG. 3 is a planar view of the finger of FIG. 1 with certain components removed for clarity.
Figure 4:
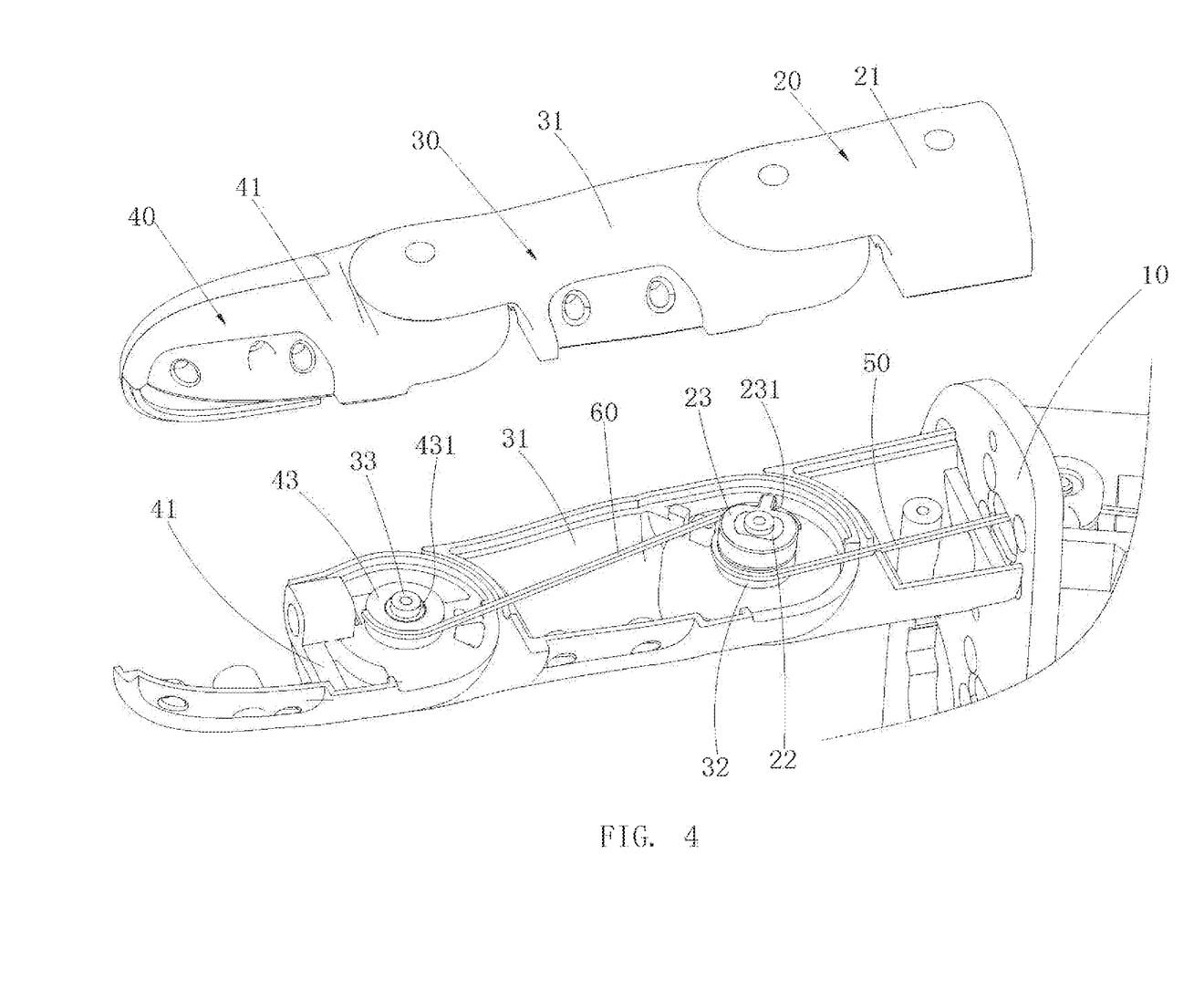
FIG. 4 is an isometric exploded view of the finger of FIG. 1.

In one embodiment, the first movable phalanx 30 and the second movable phalanx 40 both rotate between an extension position (see FIG. 1) and a flexion position (see FIG. 2). During rotation, the first movable phalanx 30 and the second movable phalanx 40 can simultaneously reach their extension positions or flexion positions. Specifically, referring to FIGS. 1 and 3, when the finger is in an extended state, the fixed phalanx 20, the first movable phalanx 30, and the second movable phalanx 40 are in a straight line. Referring to FIG. 2, when the finger is in a flexed state, the first movable phalanx 30 is substantially perpendicular to the fixed phalanx 20 and the second movable phalanx 40 is substantially perpendicular to the first movable phalanx 30. Since the first movable phalanx 30 and the second movable phalanx 40 are driven to rotate synchronously by using one actuator 70, they can simultaneously reach their extension positions or flexion positions, which achieves a controllable rotation of the finger.

Figure 5:
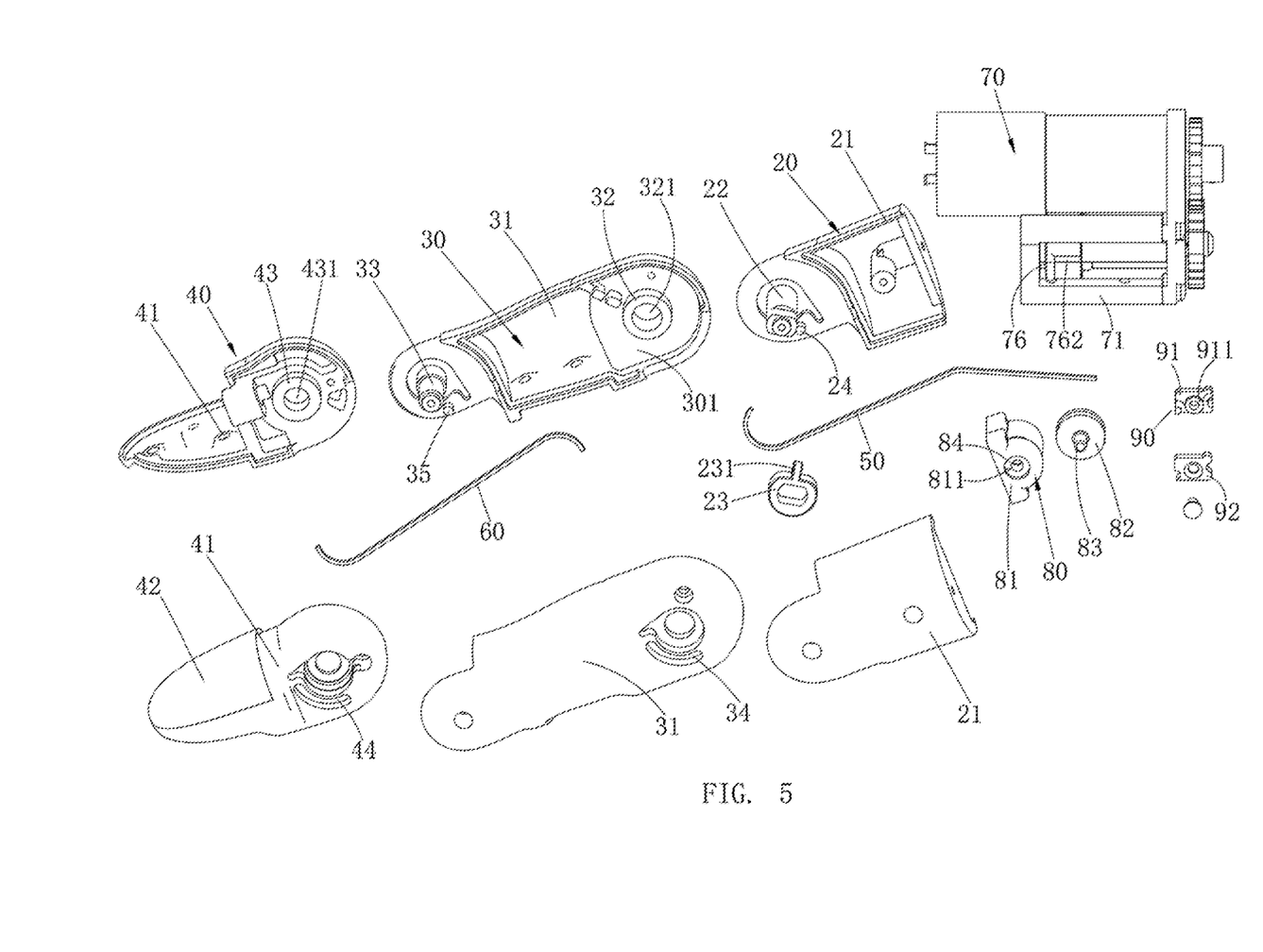
FIG. 5 is an isometric exploded view of the finger of FIG. 4 with more components separated.
Figure 6:
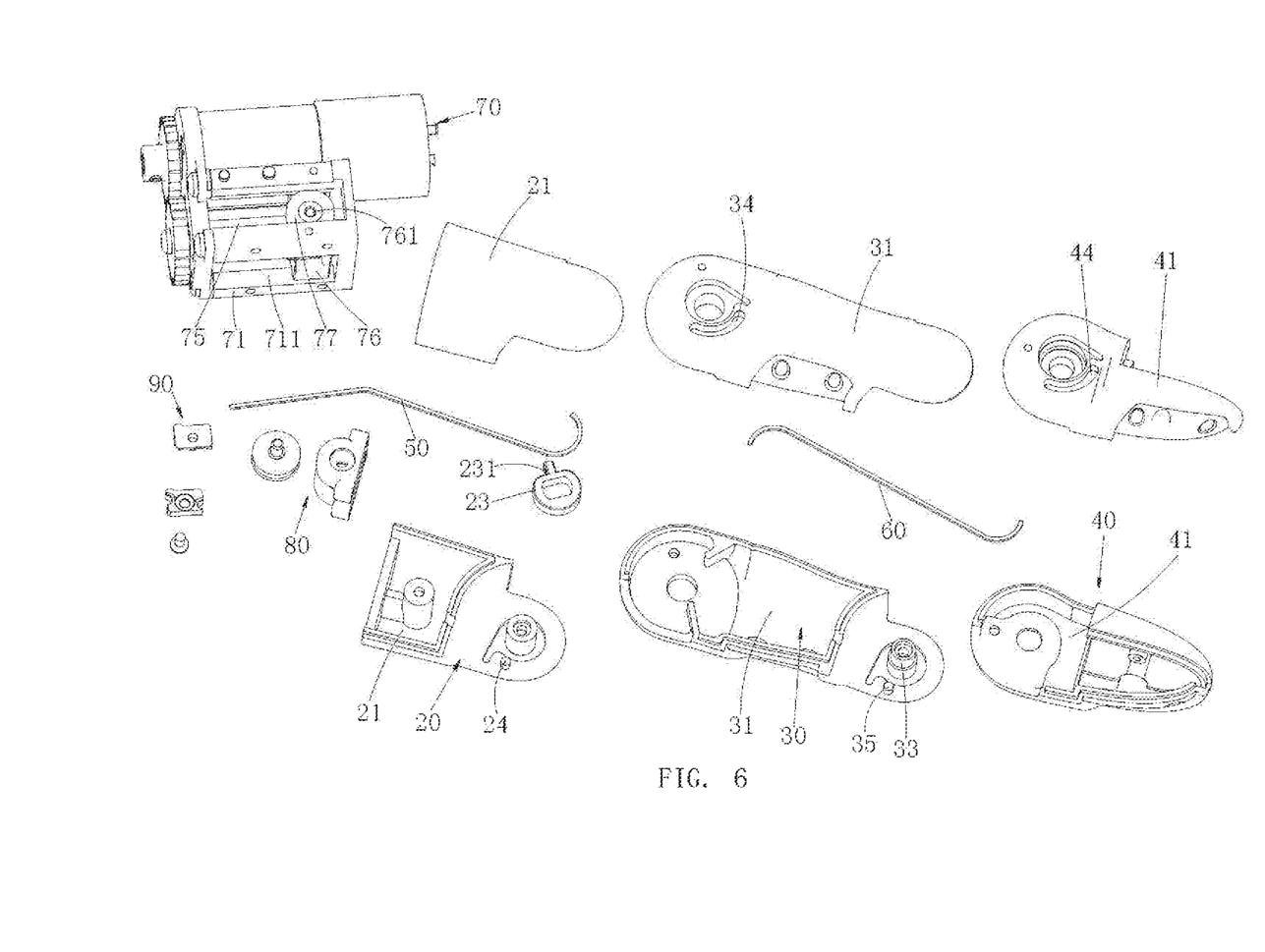
FIG. 6 is similar to FIG. 5 but viewed from another perspective.

Referring to FIGS. 5 and 6, in one embodiment, the fixed phalanx 20 has a first limiting post 24, and the first movable phalanx 30 defines a first curved groove 34. The first limiting post 24 is slidably received in the first curved groove 34 which defines a range of rotation of the first movable phalanx 30 relative to the fixed phalanx 20. The first phalanx 30 has a second limiting post 35, and the second movable phalanx 40 defines a second curved groove 44. The second limiting post 35 is slidably received in the second curved groove 44 which defines a range of rotation of the second movable phalanx 40 relative to the first movable phalanx 30. When the first limiting post 24 comes into contact with either end of the first curved groove 34, the second limiting post 35 comes into a corresponding end of the second curved groove 44, which stops the rotation of the first movable phalanx 30 and the second movable phalanx 40.

In one embodiment, the finger further includes a pulley assembly 80 fixed to the palm portion 10. The pulley assembly 80 includes a support 81 fixed to the palm portion 10 and a pulley 82 rotatably connected to the support 811. The first pulling member 50 wraps around the pulley 82. The pulley assembly 80 is used to guide the first pulling member 50. When the actuator 70 drives the first pulling member 50 to move, the pulley 82 rotates to prevent the first pulling member 50 from interfering with other components. The pulley 82 is fixed to a rotating shaft 83, and the support 81 defines a through hole 811. The through hole 811 is provided with a bearing 84 for supporting the rotating shaft 83.

In one embodiment, the actuator 70 includes a bracket 71, a motor 72 mounted to the bracket 71 and including an output shaft, a drive gear 73 coaxially fixed to the output shaft, a driven gear 74 engaged with the drive gear 73, a screw rod 75 rotatably connected to the bracket 71, and a nut 76 engaged with and slidable with respect to the screw rod 75. The driven gear 74 is fixed to the screw rod 75, and an opposite end of the first pulling member 50 is fixed to the nut 76. The drive gear 73 meshes with the driven gear 74, which serves as a speed reducer to reduce the rotation speed outputted by the output shaft of the motor 72. The driven gear drives the screw rod 75 to rotate. The screw rod 75 then drives the nut 76 to slide. The nut 76 pulls the first pulling member 50 to realize the flexion of the finger. The motor 72 is arranged at one side of the mounting bracket 71, and the drive gear 73 and the driven gear 74 are located at one end of the mounting bracket 71, and the overall structure is compact.

The nut 76 has a mounting shaft 761 and a roller 77 rotatably connected to the mounting shaft 761. The roller 77 is rotatably received in a groove in a side of the mounting bracket 71. The mounting bracket 71 defining a sliding groove 711 in a bottom thereof for sliding the nut 76 therein. The longitudinal direction of the sliding groove 711 is parallel to the longitudinal direction of the screw rod 75.

The nut 76 includes a clamping assembly 90 including a first clamping block 91 and a second clamping block 92 connected to the first clamping block 91. The first clamping block 91 has a post 911 for the first pulling member 50 to be wound thereon. The first clamping block 91 and the second clamping block 92 corporately hold one end of the first pulling member 50 in position. The clamping structure 90 is easy to assemble and can be easily fixed in a mounting groove 762 of the nut 76, and can fix one end of the first pulling member 50 to the nut 76.

In one embodiment, the finger may include one or more additional phalanxes (not shown). One of the additional phalanxes is pivotally connected to the second movable phalanx 40. The finger may include one or more additional pulling members to pull the additional phalanxes so as to rotate the additional phalanxes when the second movable phalanx 40 rotates.

The assembly relationship between one additional pulling member and two corresponding adjacent additional phalanxes may refer to the assembly relationship between the fixed phalanx 20, the first movable phalanx 30, the second movable phalanx 40 and the second flexible pulling member 60. Specifically, any three adjacent additional movable phalanxes are connected to one another through two revolute joints, and one additional pulling member is arranged between two adjacent additional movable phalanxes. A first one of the additional movable phalanxes includes a front shaft receiver defining a through hole. A second one of the additional movable phalanxes adjacent to the first one of the additional movable phalanxes includes a middle shaft and a middle shaft receiver defining a through hole at opposite ends thereof. A third one of the additional movable phalanxes adjacent to the second one of the additional movable phalanxes includes a rear shaft. The middle shaft is received in the through hole of the first shaft receiver and the rear shaft is received in the through hole of the middle shaft receiver, which forms two revolute joints. Each additional pulling member includes two ends respectively connected to a shaft receiver of one additional movable phalanx and a shaft of an adjacent additional movable phalanx.

It should be noted that the number of the additional pulling member is not limited. The number of the pulling members is one less than the number of the phalanxes. A ratio of the angular velocity of the movable phalanx to the angular velocity of an adjacent movable phalanx can be adjusted by changing the ratio of the diameter of the shaft receiver of the movable phalanx to the shaft receiver of the adjacent movable phalanx.

In one embodiment, a robot includes a robotic hand including a finger as described above. With such configuration, the first movable phalanx 30 and the second movable phalanx 40 are driven to rotate by using one actuator 70, which facilitates the compactness and reduction of weight and cost of the robotic hand.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A finger of a robotic hand, comprising:
a palm portion;
a fixed phalanx fixed to the palm portion;
a first movable phalanx rotatably connected to the fixed phalanx;
a second movable phalanx rotatably connected to the first movable phalanx;
a first pulling member configured to pull the first movable phalanx so as to rotate the first movable phalanx with respect to the fixed phalanx; and
a second pulling member configured to pull the second movable phalanx so as to rotate the second movable phalanx with respect to the first movable phalanx;
wherein the fixed phalanx comprises a first shaft, the first movable phalanx comprises an inner surface and a first shaft receiver protruding from the inner surface, the first shaft receiver defines a first receiving hole to rotatably receive the first shaft therein, and one end of the first pulling member is fixed to the first shaft receiver.

2. The finger according to claim 1, wherein the first movable phalanx comprises a second shaft, the second movable phalanx comprises a second shaft receiver, the second shaft receiver defines a second receiving hole to rotatably receive the second shaft therein, and the second pulling member comprises two opposite ends respectively fixed to the first shaft and the second shaft receiver, an imaginary plane determined by rotation axes of the first shaft and the second shaft intersects the second pulling member in a position between the first shaft and the second shaft.

3. The finger according to claim 2, further comprising a cap fixed to the first shaft, wherein one of the two ends of the second pulling member is fixed to the first shaft via the cap.

4. The finger according to claim 3, wherein the cap and the first shaft are connected to each other through profile shaft connection.

5. The finger according to claim 1, wherein the actuator comprises a bracket, a motor mounted to the bracket and comprising an output shaft, a drive gear coaxially fixed to the output shaft, a driven gear engaged with the drive gear, a screw rod rotatably connected to the bracket, and a nut engaged with and slidable with respect to the screw rod, the driven gear is fixed to the screw rod, and an opposite end of the first pulling member is fixed to the nut.

6. A finger of a robotic hand, comprising:
a palm portion;
a fixed phalanx fixed to the palm portion, the fixed phalanx having a first shaft;
a first movable phalanx rotatably connected to the fixed phalanx;
a second movable phalanx rotatably connected to the first movable phalanx;
a first pulling member configured to pull the first movable phalanx so as to rotate the first movable phalanx with respect to the fixed phalanx;
a second pulling member configured to pull the second movable phalanx so as to rotate the second movable phalanx with respect to the first movable phalanx;
an actuator configured to pull the first pulling member; and
a cap fixed to the first shaft;
wherein the first movable phalanx comprises a first shaft receiver, the first shaft receiver defines a first receiving hole to rotatably receive the first shaft therein, and one end of the first pulling member is fixed to the first shaft receiver;
the first movable phalanx comprises a second shaft, the second movable phalanx comprises a second shaft receiver, the second shaft receiver defines a second receiving hole to rotatably receive the second shaft therein, and the second pulling member comprises two opposite ends respectively fixed to the first shaft and the second shaft receiver, an imaginary plane determined by rotation axes of the first shaft and the second shaft intersects the second pulling member in a position between the first shaft and the second shaft; and
one of the two ends of the second pulling member is fixed to the first shaft via the cap.

7. The finger according to claim 6, wherein a diameter of the first shaft receiver is equal to a diameter of the second shaft receiver.

8. The finger according to claim 6, wherein the cap and the first shaft are connected to each other through a profile shaft connection.

9. The finger according to claim 6 further comprising a support fixed to the palm portion and a pulley rotatably connected to the support, wherein the first pulling member wraps around the pulley.

10. The finger according to claim 6, wherein the actuator comprises a bracket, a motor mounted to the bracket and comprising an output shaft, a drive gear coaxially fixed to the output shaft, a driven gear engaged with the drive gear, a screw rod rotatably connected to the bracket, and a nut engaged with and slidable with respect to the screw rod, the driven gear is fixed to the screw rod, and an opposite end of the first pulling member is fixed to the nut.

11. A robot comprising a robotic hand that comprises a finger, the finger comprising:
a palm portion;

a fixed phalanx fixed to the palm portion, the fixed phalanx having a first shaft;
a first movable phalanx rotatably connected to the fixed phalanx;
a second movable phalanx rotatably connected to the first movable phalanx;
a first pulling member configured to pull the first movable phalanx so as to rotate the first movable phalanx with respect to the fixed phalanx;
a second pulling member configured to pull the second movable phalanx so as to rotate the second movable phalanx with respect to the first movable phalanx;
an actuator configured to pull the first pulling member; and
a cap fixed to the first shaft;
wherein the first movable phalanx comprises a first shaft receiver, the first shaft receiver defines a first receiving hole to rotatably receive the first shaft therein, and one end of the first pulling member is fixed to the first shaft receiver;
the first movable phalanx comprises a second shaft, the second movable phalanx comprises a second shaft receiver, the second shaft receiver defines a second receiving hole to rotatably receive the second shaft therein, and the second pulling member comprises two opposite ends respectively fixed to the first shaft and the second shaft receiver, an imaginary plane determined by rotation axes of the first shaft and the second shaft intersects the second pulling member in a position between the first shaft and the second shaft; and
one of the two ends of the second pulling member is fixed to the first shaft via the cap.

12. The robot according to claim 11, wherein a diameter of the first shaft receiver is equal to a diameter of the second shaft receiver.

13. The robot according to claim 11, wherein the cap and the first shaft are connected to each other through profile shaft connection.

14. The robot according to claim 11 further comprising a support fixed to the palm portion and a pulley rotatably connected to the support, wherein the first pulling member wraps around the pulley.

15. The robot according to claim 11, wherein the actuator comprises a bracket, a motor mounted to the bracket and comprising an output shaft, a drive gear coaxially fixed to the output shaft, a driven gear engaged with the drive gear, a screw rod rotatably connected to the bracket, and a nut engaged with and slidable with respect to the screw rod, the driven gear is fixed to the screw rod, and an opposite end of the first pulling member is fixed to the nut.

* * * * *